Nov. 20, 1951      W. DOBLE      2,575,549

ROTARY SHAFT SEAL

Filed Oct. 12, 1948

INVENTOR.
WARREN DOBLE
BY HIS ATTORNEYS.
HARRIS, KIECH, FOSTER & HARRIS

Patented Nov. 20, 1951

2,575,549

UNITED STATES PATENT OFFICE 2,575,549

ROTARY SHAFT SEAL

Warren Doble, North Hollywood, Calif., assignor, by mesne assignments, to Jabsco Pump Company, Burbank, Calif., a copartnership composed of Maurice C. McCray, Alan A. McCray, Albert R. Hutchins, R. J. McCray, and Warren Doble Application October 12, 1948, Serial No. 54,057

1 Claim. (Cl. 286—11.15)

This invention relates to improvements in shaft seals and more particularly to a shaft seal adapted to be utilized in conjunction with the drive shaft of a rotary pump to prevent the leakage of fluid from the body of the pump along the shaft.

Shaft seals are designed to prevent the leakage of fluid under pressure from the body of a pump through the aperture from which the shaft of the pump projects. Since the shaft in a rotary pump rotates, seals designed to be utilized with rotary shafts are called rotary seals.

Conventional shaft seals include a sealing ring intended for rotation with the shaft and also for free movement axially upon the shaft in order to seat upon a smooth seat within the body of the pump and thus effect a leak-proof seal about the shaft. A carbon ring, O-ring, or similar member incorporated in the sealing ring is, therefore, pressed against the seat and the shaft tightly enough to prevent the leakage of fluid but not so tightly as to prevent the axial movement of the sealing ring.

A prime requisite of rotary shaft seals is that the sealing ring be positively driven and thus always rotate with the shaft and have embodied therein or associated therewith a resilient member adapted to bias the sealing ring firmly upon its seat within the pump and thus prevent the leakage of fluid from the pump.

By my invention, I provide an inexpensive but positive interconnecting element which insures the rotation of the sealing ring with the shaft at all times but which is resilient enough to permit the axial movement of the sealing ring upon the shaft, while positive driving interconnection between the shaft and the ring is maintained. Since it is desirable that rotary seals be as small and as simple as possible, the simplicity and moderate size attainable with a seal constructed in accordance with my invention is an important advantage of the invention.

Rotary pumps of the type under discussion must occasionally be torn down to replace the impeller which becomes unbalanced and inefficient due to wear. When the removal of the impeller takes place in pumps fitted with conventional seals, it frequently happens that the rotary seal is inadvertently pulled off the shaft with the impeller and is dropped, damaged or lost. In seals constructed in accordance with my invention the possibility of such a contingency arising is negligible, since the interconnecting element grips the shaft when the impeller is removed from the shaft and thus prevents the inadvertent dislodgment of the seal with its consequent damage or loss.

It is, therefore, a primary object of my invention to provide a seal for rotary shafts which has embodied therein an interconnecting element adapted to provide a positive drive from the shaft to the seal to insure the continuous rotation of the seal upon the shaft.

Another object of my invention is the provision of a rotary shaft seal which has an interconnecting element embodied therein which is adapted to provide for the positive rotation of the seal by the shaft but which will permit the axial movement of the seal upon the shaft.

Another object of my invention is the provision of a rotary shaft seal which is adapted to be securely retained upon the shaft when the impeller is removed from the shaft.

Another object of my invention is the provision of a rotary shaft seal incorporating an element adapted to establish the shaft and the seal in driven relationship which, in addition, is capable of retaining the seal upon the shaft when the impeller of a pump is removed from the shaft for replacement purposes.

Another object of my invention is the provision of a rotary shaft seal which is small in size, composed of a minimum number of parts and capable of being easily and cheaply manufactured.

A further object of the invention is to provide such a shaft seal in which an annular sealing member is maintained in sealing relationship with its seat at all times.

Other objects and advantages of my invention will appear from the following specification and the accompanying drawing, which is for the purpose of illustration only and in which.

Figure 1:
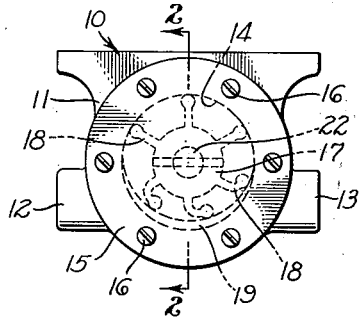
Fig. 1 is a vertical elevational view of a pump incorporating a shaft seal constructed in accordance with my invention.

Referring to the drawing, I show a pump 10 which includes a body 11 having an inlet port 12 and an outlet port 13. The main portion of the pump body 11 is generally circular in shape and has formed therein a pump chamber 14 which is open at one side and adapted to be closed by a cover plate 15 which is secured to the pump body 11 by means of screws 16 or similar fastenings.

Housed within the pump chamber 14 is an impeller 17 formed of rubber or a similar resilient material and having spaced, outwardly projecting vanes 18 which are adapted to contact the walls of the chamber 14 and be deflected by means of a cam plate 19 which is secured within the chamber 14 by means of a screw 21 or similar fastening or formed integral therewith.

The impeller 17 is mounted upon one end of a rotary drive shaft 22 through the intermediary of a sleeve 23 which is interposed between the impeller 17 and the drive shaft 22. A slot 20 is formed in the end of the shaft 22, and a pin 24 which passes through the rotor 17 and the sleeve 23 is secured therein to nonrotatably secure the rotor 17 upon the end of the shaft 22. The shaft 22 projects from the main portion of the pump body 11 through a necked-down portion 25 of the pump body 11.

Figure 3:
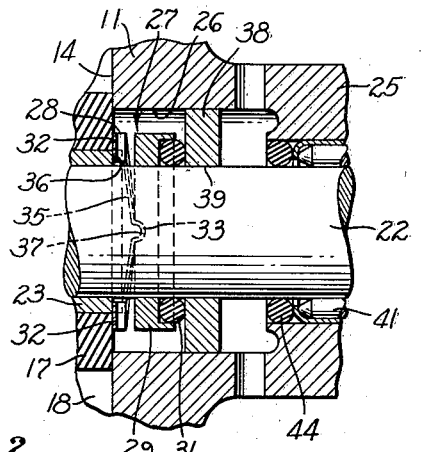
Fig. 3 is an enlarged, fragmentary sectional view showing a seal constructed in accordance with my invention installed about a shaft.
Figure 2:
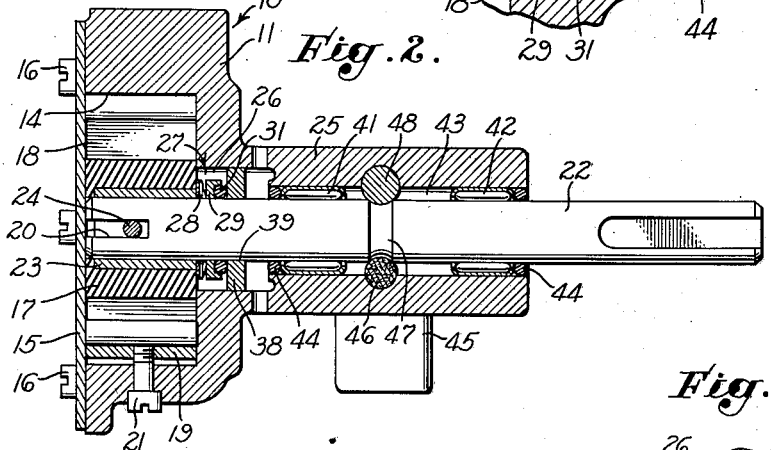
Fig. 2 is a vertical sectional view taken on line 2—2 of Fig. 1.

The pump chamber 14 is counterbored to provide a seal chamber 26 in which is disposed a seal 27 constructed in accordance with my invention. The seal 27 consists, as is most clearly shown in Fig. 3, of an interconnecting element 28, the function and purpose of which will be described in greater detail below, which biases in against an annular, flanged ferrule 29 in which is positioned an O-ring 31, which may be of rubber, or other suitable material. Although the ring 31 is shown as having a circular cross section, this is not essential.

Figure 4:
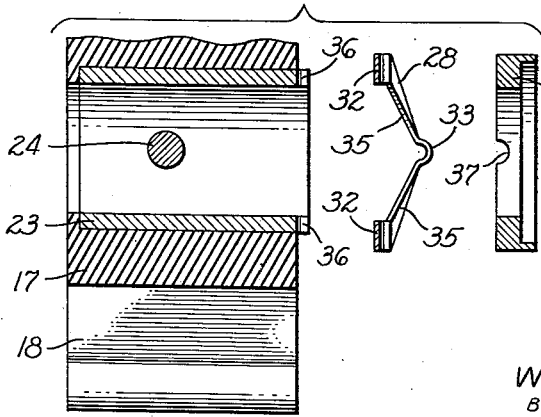
Fig. 4 is an enlarged view, partially in elevation and partially in section, showing the interconnecting element, sealing ring and impeller utilized in the seal.

The interconnecting element 28 which, as best shown in Fig. 4, consists of a marcel type washer, is generally circular in shape and is formed from a material having resilient characteristics, such as beryllium copper. Four integrally formed projections are preferably spaced at 90° intervals about the body of the interconnecting element 28 with two projections 32 facing in one direction and two projections 33 facing in the other direction in planes parallel to the axis of the shaft 22. A greater or less number of projections 32 may be used as desired. The projections 32 and 33 are interconnected by means of arms 35 integral therewith which spring from the projections 32 as a base and are adapted to be deflected when the interconnecting element 28 is positioned between the impeller sleeve 23 and the ferrule 29.

Formed in the end of the impeller sleeve 23, as is best shown in Fig. 4, are two depressions 36 spaced 180° apart on the end of the sleeve and adapted to receive the projections 32 on the interconnecting element 28 in their depths. If desired, the sleeve 23 may be omitted, in which case the depressions 36 are formed in the end of the impeller 17. Also, more than two such depressions 36 may be provided as desired. Similar depressions 37, as shown in Fig. 4, are formed in the ferrule 29 and are adapted to receive the projections 33 of the interconnecting member 28 to establish an operative relationship between the shaft 22 and the ferrule 29. The depressions 36 and 37 constitute seating means adapted to receive the projections 32 and 33.

Therefore, when the shaft 22 rotates, the impeller 17 and sleeve 23 rotate with it. The projections 32, since they are seated in the depressions 36 in the sleeve 23, cause the interconnecting element 28 to rotate with the shaft 22. Since the projections 33 are seated in the depressions 37 in the ferrule 29, the rotation of the interconnecting element 28 will cause the ferrule 29 to rotate. The ferrule 29 will, in turn, cause the O-ring 31 to rotate with and at the same speed as the shaft 22. Thus, the seal 27 is positively rotated with the shaft 22 through the intermediary of the interconnecting element 28. In this manner, the possibility that the seal 27 may not rotate with the shaft 22 but will bind upon it, causing frictional wear of both shaft and seal and permitting the leakage of fluid past the seal, is avoided.

Pressed into the seal chamber 26 is a stationary seal seat 38 which has a hole 39 formed therein adapted to permit the shaft 22 to pass therethrough. The O-ring 31 is biased against the seal seat 38 by the expansive force of the interconnecting member 28 and the possibility of fluid leakage out of the hole 39 along the shaft 22 is eliminated. The resilient arms 35 of the interconnecting member 28 tend to drive the seal 27 and its incorporated O-ring 31 into contact with the seal seat 38 at all times but, nevertheless, the resilience of the arms 35 permits the seal 27 to move axially in respect to the shaft 22 when such movement is necessary. Such construction insures that the O-ring is held squarely against the seal seat 38 in sealing relation therewith at all times.

When the interconnecting element 28 is installed about the shaft 22 between the impeller sleeve 23 and the ferrule 29, the arms 35 of the interconnecting element 28 are in a state of compression and the circular opening which they define is sufficient to clear the periphery of the shaft 22 as it rotates within the interconnecting element 28. However, should the pressure upon the arms 35 of the interconnecting element 28 be released, as by the removal of the impeller 17 and its associated sleeve 23 from the shaft 22, the arms 35 will return to their non-compressed condition and the opening defined by them will be sufficiently reduced to cause the interconnecting element 28 to grip securely upon the periphery of the shaft 22. Therefore, the interconnecting element 28 resists the dislodgment of the seal 27 from the shaft 22, and the possibility that the seal 27 will fall off the shaft and be damaged when the impeller 17 is removed from the pump chamber 14 is avoided.

The shaft 22 extends beyond the seal seat 38 into the necked-down portion 25 of the pump body 11 and is mounted upon bearings 41 and 42 which are pressed into a bore 43 formed in the interior of the necked-down portion 25 of the pump body 11. A plurality of O-rings 44 serve to prevent the leakage of lubricating oil from the bore 43. The lubricating oil is dispensed to the shaft 22 from an oiler 45 through the medium of a wick 46 which impinges upon the shaft 22 in the region of a groove 47 formed in the periphery of the shaft 22. A locking pin 48 driven through the necked-down portion 25 of the pump body 11 registers with the groove 47 and prevents the axial movement of the shaft 22 within the bore 43.

Figure 5:
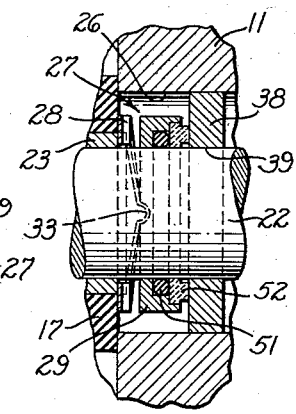
Fig. 5 is a fragmentary sectional view of another embodiment of my invention.

Another embodiment of my invention is shown in Fig. 5 of the drawing and includes the interconnecting member 28 which serves to connect the sleeve 23 of the impeller 17 with the flanged ferrule 29. The ferrule 29 provide a housing for an O-ring 51 which serves to prevent fluid leakage along the shaft 22 and a ring 52 formed of carbon, micarta or similar material, which impinges on the seal seat 38 and serves as a face seal to prevent fluid leakage past the seal seat 38 along the shaft 22.

The expansive force exerted upon the ferrule 29 by the interconnecting member 28 forces the face seal 52 into constant contact with the surface of the seal seat 38 and the O-ring 51 is held in contact with the shaft 22 by the ferrule 29.

My invention thus provides a seal for a rotary shaft which is so constituted that the positive rotation of the seal is assured by the provision of an interconnecting element which is resiliently biased into engagement with the shaft itself through the medium of an impeller sleeve mounted upon the shaft. Of course, it is conceivable that the interconnecting element might engage, not the end of the impeller sleeve, but a flange formed integrally with the shaft itself or some similar arrangement.

The resilient nature of the interconnecting element permits the seal to move axially along the shaft despite the positive engagement between the shaft and the seal. In addition, the interconnecting element is so designed that, when the compressive effect of the interconnection between the shaft and the seal is removed, it will seize upon the periphery of the shaft about which it is positioned and prevent the inadvertent dislodgment of the seal from the shaft when other components of the pump are removed.

Although I have shown and described a preferred embodiment of my invention, it will be appreciated that certain parts and elements thereof may be replaced by other parts and elements having the same function and method of operation, and therefore I do not intend to be limited to the specific construction shown, but desire to be afforded the full scope of the following claim.

I claim as my invention:

In a shaft seal adapted to be used with a rotatable shaft, the combination of: an annular sealing element adapted to encircle the shaft; an annular follower member adapted to encircle the shaft and to engage said sealing element; and a spring washer member adapted to encircle the shaft and to engage said follower member, said washer member having a central opening of sufficiently large diameter so that when said washer member is axially compressed there is clearance between the wall of said opening and the shaft and of sufficiently small diameter so that when said washer member is not axially compressed said wall grips the shaft.

WARREN DOBLE.

REFERENCES CITED

The following references are of record in the file of this patent:

UNITED STATES PATENTS

| Number | Name | Date |
|---|---|---|
| 1,746,068 | Barnes | Feb. 4, 1930 |
| 1,899,785 | Woodruff | Feb. 28, 1933 |
| 1,926,006 | Kohler | Sept. 5, 1933 |
| 1,956,366 | Vedovell | Apr. 24, 1934 |
| 2,319,776 | Copeland et al. | May 25, 1943 |
| 2,407,218 | Beier | Sept. 10, 1946 |
| 2,438,457 | Schlosser | Mar. 23, 1948 |
| 2,474,123 | Schmitz | June 21, 1949 |